United States Patent [19]

Sroka

[11] 3,915,737
[45] Oct. 28, 1975

[54] METHOD AND APPARATUS FOR REMOVING FOREIGN PARTICLES FROM A CALENDERED SHEET BY NEUTRALIZATION OF STATIC ON THE SHEET

[75] Inventor: Edward A. Sroka, Newton, Mass.
[73] Assignee: The General Tire & Rubber Company, Akron, Ohio
[22] Filed: Nov. 21, 1973
[21] Appl. No.: 417,996

[52] U.S. Cl. .................. 134/1; 15/1.5; 15/308; 134/9; 134/21
[51] Int. Cl.² .................. B08B 1/02; B08B 6/00
[58] Field of Search .......... 134/1, 9, 15, 21, 37; 15/1.5, 306 A, 308, 309, 21 B

[56] References Cited
UNITED STATES PATENTS

| | | | |
|---|---|---|---|
| 2,015,583 | 9/1935 | Bartsch | 15/308 |
| 2,920,987 | 1/1960 | Landry et al. | 134/1 |
| 3,128,492 | 4/1964 | Hanscom et al. | 15/1.5 X |
| 3,395,042 | 7/1968 | Herbert, Jr. | 134/1 |
| 3,668,008 | 6/1972 | Severynse | 134/1 |
| 3,780,391 | 12/1973 | Leenhouts | 15/1.5 |

Primary Examiner—S. Leon Bashore
Assistant Examiner—Richard V. Fisher

[57] ABSTRACT

A method and apparatus is provided for removing foreign particles from the face of a continuously moving calendered sheet. The method comprises brushing the face of the sheet to loosen the foreign particles, then ionizing the air adjacent the face to provide positive and negative ions which are capable of neutralizing oppositely charged foreign particles on the face of the sheet. Flowing air is provided over the ionizing means to remove at least a portion of the neutralized foreign particles. The face of the sheet is then passed in sliding contact with at least one set of bristles, the set including (i) a major portion of non-metallic bristles to remove substantially all of the remaining foreign particles and (ii) a minor portion of grounded electrically conductive bristles to dissipate any static charge on the sheet. Simultaneously, air flow is provided adjacent the set of bristles to carry away substantially all the remaining foreign particles from the face of the sheet. Apparatus is provided to accomplish the above identified steps.

18 Claims, 1 Drawing Figure

U.S. Patent  Oct. 28, 1975  3,915,737
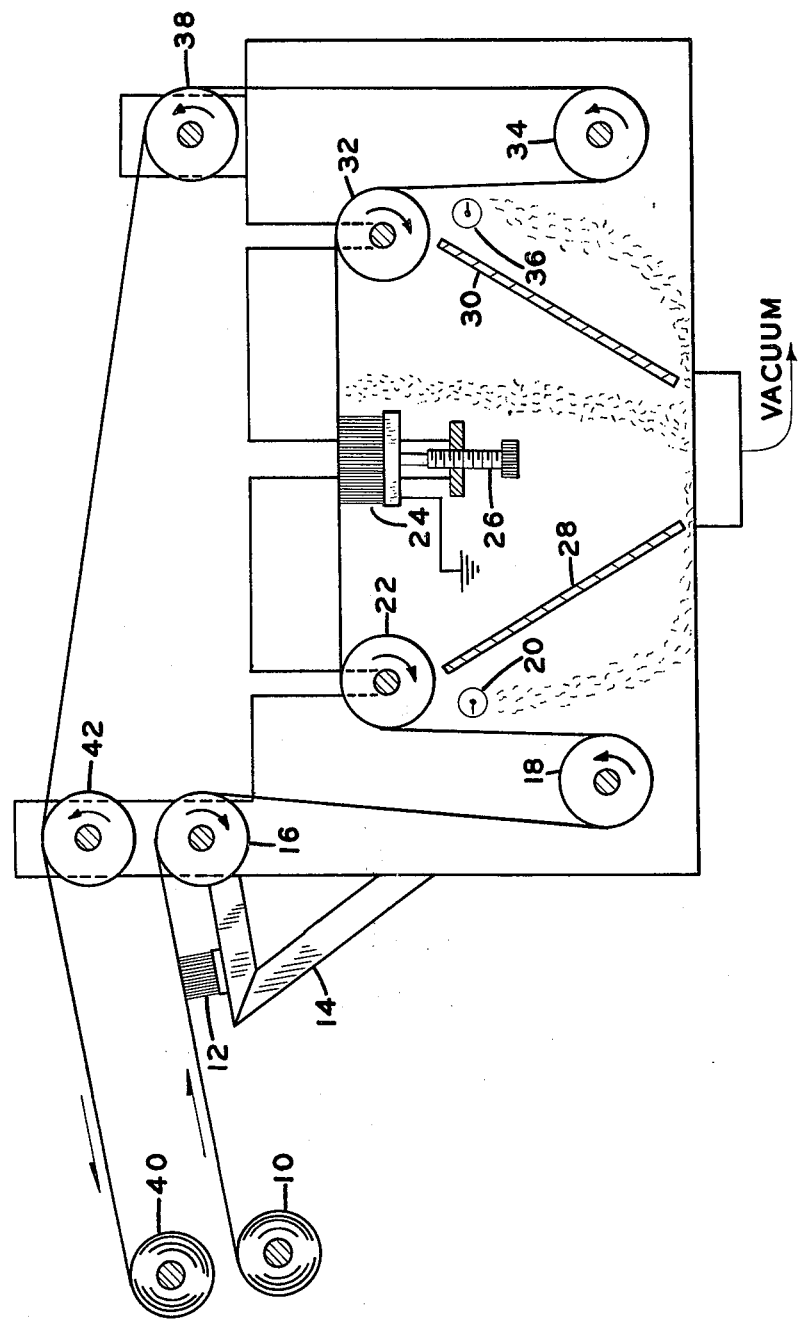

METHOD AND APPARATUS FOR REMOVING FOREIGN PARTICLES FROM A CALENDERED SHEET BY NEUTRALIZATION OF STATIC ON THE SHEET

BACKGROUND OF THE DISCLOSURE

The present invention relates to continuously moving calendered sheet, and more particularly, to a method and apparatus for continuously removing unwanted foreign particles from such a sheet. While the subject invention may be used to remove foreign particles from any type of moving calendered sheet, it is especially advantageous when used for fabric-backed, thermoplastic sheeting as a work piece which has a plastic work face or surface which is to be subsequently printed or embossed for example, and the invention will be discussed in connection therewith.

The term "foreign particles" as used herein is intended to mean and include not only lint from the fabric backing, but also dust and dirt from the atmosphere of the factory which adheres to the face of the calendered sheet, i.e., the surface which is to be finished. Such foreign particles are especially troublesome on a calendered sheet because they tend to become electrostatically charged during the calendering and subsequent processing of the sheet, which increases the tendency of the particles to adhere to the surface of the sheet.

The foreign particles, and especially the lint from the fabric backing, can adversely affect the quality of the product in several ways. If the calendered sheet is subsequently printed, the printing may not adhere in places where there is lint, and in addition, the lint may be picked up by the printing roll during the printing process and permitted to get into the solvent, possibly causing additional wear of the seals in the solvent pumps. On the other hand, if the calendered sheet is later embossed, any lint on the face of the sheet may be forced into the thermoplastic, thus creating a visible surface defect on the sheet.

In an effort to eliminate such foreign particles as lint and dust, it has been the standard procedure to pass the calendered sheet over a roll on which a layer of adhesive tape is reverse wrapped, i.e., with the sticky side of the tape facing outward. As the sheet comes in contact with this wrapped roll, a large portion, but not all of the foreign particles adhere to the adhesive tape. It is apparent, however, that after a certain period of time, almost the entire surface of the idler roll will be covered with the foreign particles removed from the calendered sheet, thus gradually decreasing the effectiveness of the wrapped roll in its ability to remove the particles from the sheet. Depending upon the type of calendered sheet and whether or not it is fabric backed, it has been found necessary to change the adhesive tape on the idler roll at least once for every 3 hours of operation, and sometimes as often as once every hour. Therefore, this method of particle removal adds not only the cost of the adhesive tape to the process, but also the labor involved in the periodic changes of the tape. In addition, the changing of the tape necessarily involves a certain period of down time and attendant expense for the overall, continuous process.

SUMMARY OF THE INVENTION

Accordingly, it is an object of the present invention to provide a means and method for removing foreign particles from the face of the calendered sheet.

It is a more detailed object of the present invention to provide such a means and method which is continuous, not requiring periodic down time, and which operates at substantially maximum efficiency at all times, thus resulting in a product which is uniformly free of foreign particles.

It is an additional object of the present invention to provide a particle removal method which also dissipates static electricity on the calendered sheet, thus eliminating the chance of fire when the sheet is subsequently exposed to volatile fumes, such as those at a printing station.

These and other objects of the present invention, which will become apparent upon a reading of the following detailed description, are accomplished by the provision of a method and apparatus for removing foreign particles from the work face of a moving calendered sheet. The method comprises:

a. prebrushing the face to loosen the foreign particles;

b. ionizing the air adjacent the face to provide positive and negative ions which are capable of neutralizing oppositely charged foreign particles on the face of the sheet;

c. providing air flowing over said ionizing means to remove at least a portion of the neutralized foreign particles;

d. passing the face of the sheet in brushing contact with at least one set of bristles, said set including
 i. a major portion of non-metallic bristles to remove substantially all of the remaining foreign particles and
 ii. a minor portion of electrically conductive, grounded bristles to dissipate any static charge on the sheet; and e. providing air flowing adjacent said set of bristle means to carry away substantially all of the remaining foreign particles from the face of the sheet.

DESCRIPTION OF THE PREFERRED EMBODIMENTS

Referring now to the drawing, which is for the purpose of illustrating preferred embodiments of the present invention and not for limiting the same, the FIGURE is a simple schematic illustration of the type of apparatus which may be used for practicing the method described herein and which may be conveniently fabricated in shops which produce or overhaul calendering and related equipment.

The calendered sheet material is taken from a let-off roll 10, although it may proceed directly from the calendering operation to the apparatus illustrated. At this point, the sheet should be oriented face downward, i.e., the face which is to be printed or embossed should be downward, and the face passed over the bristles of a "breaker" brush 12, supported by a frame member 14. The term breaker has been used in reference to the brush 12 because it has been found desirable to utilize a preliminary or prebrushing operation to break the bond between the foreign particles (lint, dust, etc.) and the face of the sheet. The set of bristles in the brush 12 preferably comprises relatively soft bristles, such as tampico bristles, which will not scratch the calendered sheet or build up a charge. Depending upon the surface of the calendered sheet, it may be desirable to provide an additional scrubbing action by reciprocating the brush 12 in a direction perpendicular to the travel of the sheet (i.e., into and out of the page in the figure).

The sheet then passes over idler roll 16, down around idler roll 18, then past static eliminator bar 20. The bar 20 is employed to ionize the air, especially in a zone in the gap between it and the face of the sheet, so that charged foreign particles on the face of the sheet will be neutralized by oppositely charged ions in the air. Static eliminator bars of the type useful in the present invention are commercially available, such as the "Simco Static Bars" sold by the Simco Company. Such a static bar is simple to use and requires only a standard 110 volt factory outlet. The bar 20 should be in a stationary position generally parallel to the face of the sheet and oriented, about its longitudinal axis, in such a way that the maximum ionization of the surrounding air occurs in the gap between the bar and the face of the sheet. It has been found that satisfactory performance is achieved if the ionized zone in the gap between the outside surface of the bar and the face of the sheet is from about one-half inch to about 1 inch. It should be noted that at the bottom of the apparatus there is a vacuum connection, although it may be more desirable to employ several vacuum connections across the width of the apparatus, depending upon the width of the calendered sheet. While reference was made to a "vacuum connection" it should be understood that the purpose is not to actually create a vacuum within the apparatus enclosure, but merely to provide an air flow to aid in drawing the foreign particles off the face of the sheet and out of the enclosure. Note the representation of falling foreign particles below the static eliminator bar 20, moving toward the vacuum connection. Therefore, although the vacuum connection may be made to a standard factory vacuum line, it may be more desirable to utilize a separate suction means, such as a squirrel-cage fan or some other type of blower motor.

The sheet next passes over idler roll 22 then over a set of electrically conducting and grounded bristles 24 which may be vertically adjusted by threaded member 26 to maintain the set of bristles 24 in contact with the face of the sheet, which is again facing downward, while at the same time making sure that the weight of the sheet does not collapse the bristles. The set of bristles 24 performs several functions and accordingly includes several types of bristles. The first function is to remove as many of the remaining foreign particles as is possible. Therefore, the majority of the bristles should be of the type which are soft and to which foreign particles tend to adhere. A preferred type of bristle, within this description, is a horsehair bristle. A second function of the set of bristles 24 is to discharge or dissipate any static charge which may have built up on the sheet itself in passing over the preceding idler rolls. For this purpose, a minor portion of the bristles 24 are electrically conductive and grounded to the frame of the apparatus through appropriate electrical communication such as through threaded member 26 and the unnumbered support member through which member 26 is threaded. In the subject embodiment, about 85% of the bristles were horsehair and the remaining 15% are copper. Just as in the case of the other bristles, it is important that the conductive bristles be made in such a way that they do not scratch or otherwise mar the face of the sheet. Because a large percent of the foreign particles are removed at this post brushing stage of the method, it has been found desirable to provide a pair of deflector plates 28 and 30 to follow the falling foreign particles toward the vacuum connection, for ease of removal. The calendered sheet then passes over idler roll 32 and downward toward idler roll 34. Optionally, there may be a second static eliminator bar 36 oriented and positioned in a manner similar to the bar 20 previously described. After passing around idler roll 34, the sheet travels upward, over idler roll 38, across over idler roll 42 and onto takeup roll 40, although, alternatively, the sheet may proceed directly to the station at which finishing occurs, such as embossing or printing.

It is thus apparent that the present invention provides a method and apparatus which permits the removal of foreign particles from the face of a calendered sheet to improve the surface quality of the finished sheet, while at the same time minimizing static charge on the sheet to improve the safety of subsequent operations performed in the presence of volatile vapors.

The invention has been described in great detail sufficient to enable one of ordinary skill in the art to make and use the same. Obviously, modifications and alterations of the preferred embodiments will occur to others upon a reading and understanding of the specification and it is my intention to include all such modifications and alterations as part of my invention insofar as they come within the scope of the appended claims.

What is claimed is:

1. A method for removing unwanted foreign particles attracted by an electrostatic charge to the passing work face of a moving continuous calendered sheet preparatory to performing a subsequent processing step to said work face, such as printing or embossing, the steps comprising in sequence:
   a. prebrushing said passing work face to physically loosen said foreign particles;
   b. providing an electrically ionized zone in the air contiguous with said passing work face to continuously neutralize the electrostatic charge attracting said foreign particles to said passing work face;
   c. continuously providing air flow through said ionized zone to continuously remove a portion of said foreign particles as are physically loosened and electrostatically neutralized;
   d. continuously post brushing said passing work face with at least one set of bristle means including a portion of electrically conductive and grounded bristles and concurrently dissipating any electrostatic charge in said moving sheet to ground; and
   e. continuously providing air flow contiguous with and past said post brushing and electrostatic charge dissipating operation to carry away substantially the remainder of said foreign particles from said moving work face.

2. The method of claim 1 wherein the step of continuously post brushing and dissipating any electrical charge is performed with at least one set of bristle means including a minor portion of electrically conductive and grounded bristles.

3. The method of claim 2 wherein the physical contact of said calender sheet on said bristle means is adjustably positioned for optimum weight of contact.

4. The method of claim 1 wherein the steps of continuously providing air flow in steps (c) and (e) are performed by continuously drawing air through an enclosure wherein steps (b) and (d) are performed.

5. The method of claim 1 wherein the electrically ionized zone is maintained at a distance extending out from about one-half to 1 inch from said passing work face.

6. The method of claim 1 wherein step (b) is repeated after step (d) to neutralize the electrostatic charge of any remaining foreign particles on said passing work face as may be picked up when conveyed after step (d).

7. The method of claim 1 wherein said prebrushing step includes the combined movement of brushing in a transverse reciprocating direction and brushing along the path of the moving calendered sheet.

8. The method of claim 1 wherein: the step of continuously post brushing and dissipating any electrical charge is performed with at least one set of bristle means including a minor portion of electrically conductive and grounded bristles; the physical contact of said calender sheet on said bristle means is adjustably positioned for optimum weight of contact; the steps of continuously providing air flow in steps (c) and (e) are performed by continuously drawing air through an enclosure wherein steps (b) and (d) are performed; the electrically ionized zone is maintained at a distance extending out from about one-half to 1 inch from said passing work face; and said prebrushing step includes the combined movement of brushing in a transverse reciprocating direction and brushing along the path of the moving calendered sheet.

9. Apparatus for removing unwanted foreign particles attracted by an electrostatic charge to the passing work face of a moving continuous calendered sheet preparatory to performing a subsequent processing step to said work face, such as printing or embossing, the combination comprising in sequence:
  a. prebrushing means for continuously prebrushing said passing work face to physically loosen said foreign particles;
  b. ionizing means for providing an electrically ionized zone in the air contiguous with said passing work face to continuously neutralize the electrostatic charge attracting said foreign particles to said passing work face;
  c. air moving means continuously providing air flow through said ionized zone to continuously remove a portion of said foreign particles as are physically loosened and electrostatically neutralized;
  d. post brushing means for continuously post brushing said passing work face with at least one set of bristle means including a portion of electrically conductive and grounded bristles and concurrently dissipating any electrostatic charge in said moving sheet to ground; and
  e. air moving means continuously providing air flow contiguous with and past said post brushing means to carry away substantially the remainder of said foreign particles from said moving work face.

10. The apparatus of claim 9 wherein said post brushing means includes at least one set of bristle means including a minor portion of electrically conductive and grounded bristles.

11. The apparatus of claim 10 wherein the physical contact of said calender sheet on said bristle means is adapted to be adjustably positioned for optimum weight of contact.

12. The apparatus of claim 10 wherein said bristle means includes a major portion of soft horsehair type bristles and a minor portion of soft metallic bristles.

13. The apparatus of claim 9 wherein said air moving means includes means for continuously drawing air through an enclosure wherein said ionizing means and said post brushing means are mounted.

14. The apparatus of claim 9 wherein said ionized zone is maintained at a distance extending out from about one-half to 1 inch from said passing work face.

15. The apparatus of claim 9 wherein a second said ionizing means is mounted after said post brushing means to neutralize the electrostatic charge of any remaining foreign particles on said passing work face as may accumulate through conveying said sheet.

16. The apparatus of claim 9 wherein said prebrushing means includes means for brushing in a transverse reciprocating direction in combination with brushing along the path of the moving calendered sheet.

17. The apparatus of claim 9 wherein said prebrushing means includes a set of tampico bristles.

18. The apparatus of claim 9 wherein: said ionized zone is maintained at a distance extending out from about one-half to 1 inch from said passing work face; said post brushing means includes at least one set of bristle means including a minor portion of electrically conductive and grounded bristles; said prebrushing means includes a set of tampico bristles; said bristle means includes a major portion of soft horsehair type bristles and a minor portion of soft metallic bristles; the physical contact of said calender sheet on said bristle means is adapted to be adjustably positioned for optimum weight of contact; and said air moving means includes means for continuously drawing air through an enclosure wherein said ionizing means and said post brushing means are mounted.

* * * * *